(12) United States Patent
Ziech

(10) Patent No.: US 6,688,616 B1
(45) Date of Patent: Feb. 10, 2004

(54) SUSPENSION CAMBER AND CASTER ADJUSTMENT SYSTEM

(75) Inventor: James Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 149 days.

(21) Appl. No.: 10/007,965

(22) Filed: Dec. 7, 2001

(51) Int. Cl.$^7$ .................................................. B60G 7/02
(52) U.S. Cl. .......................... 280/86.751; 280/86.753; 280/86.754
(58) Field of Search .................. 280/86.75, 86.751, 280/86.753, 86.754, 86.758; 384/626

(56) References Cited

U.S. PATENT DOCUMENTS

| | | | |
|---|---|---|---|
| 2,299,087 A | 10/1942 | Goetz | 280/124 |
| 2,978,253 A | 9/1961 | Weiss et al. | |
| 3,526,413 A | 9/1970 | Muller | 280/96.2 |
| 3,880,444 A | 4/1975 | Bridges | 280/96.2 B |
| 3,917,308 A | 11/1975 | Schulz | 280/124 B |
| 4,059,192 A | 11/1977 | Larsen | |
| 4,194,760 A | 3/1980 | Shiomi et al. | |
| 4,267,896 A | 5/1981 | Hendriksen | 180/73 R |
| 4,424,984 A | 1/1984 | Shiratori et al. | 280/661 |
| 4,466,635 A | 8/1984 | Okada et al. | |
| 4,577,534 A | 3/1986 | Rayne | 81/484 |
| 4,706,987 A | 11/1987 | Pettibone et al. | 280/661 |
| 4,733,884 A | 3/1988 | Pettibone et al. | 280/661 |
| 4,736,964 A | 4/1988 | Specktor | 280/661 |
| 4,869,527 A | 9/1989 | Coddens | 280/663 |
| RE33,179 E | 3/1990 | Pettibone | 280/661 |
| 4,968,055 A * | 11/1990 | Reilly | 280/86.75 |
| 4,991,868 A | 2/1991 | VanDenberg | |
| 5,052,711 A | 10/1991 | Pirkey et al. | 280/661 |
| RE34,659 E * | 7/1994 | Reilly | 280/86.75 |
| 5,388,057 A | 2/1995 | January | |
| 5,398,411 A * | 3/1995 | Kusaka et al. | 29/897.2 |
| 5,538,274 A | 7/1996 | Schmitz et al. | |
| 5,640,813 A | 6/1997 | Glazik et al. | |
| 5,960,571 A | 10/1999 | Perry et al. | |
| 5,992,863 A | 11/1999 | Forbes-Robinson et al. | |
| 6,027,129 A | 2/2000 | Kleinschmit et al. | 280/86.754 |
| D423,909 S | 5/2000 | Hartin | |
| 6,302,416 B1 * | 10/2001 | Schmack | 280/512 |
| 6,409,189 B1 * | 6/2002 | Orimoto et al. | 280/86.751 |

FOREIGN PATENT DOCUMENTS

| | | |
|---|---|---|
| DE | 19613913 A1 | 4/1996 |
| EP | 0486816 A1 | 10/1991 |
| FR | 2702440 A1 | 3/1993 |

OTHER PUBLICATIONS

Automotive Technology, A System Approach, 3$^{rd}$ Edition by Jack Erjavec, Delmar Publishing, 99–21134 CIP, Section 7, pp. 1124–1127.

(List continued on next page.)

*Primary Examiner*—Paul N. Dickson
*Assistant Examiner*—Toan To
(74) *Attorney, Agent, or Firm*—Dykema Gossett PLLC

(57) ABSTRACT

A suspension adjustment device for adjusting both camber and caster of a wheel is provided. A suspension control arm is mounted between a pair of vehicle frame support members using a single fastener. Cams are disposed on either end of the fastener. The cams rotate in grooves defined in the vehicle frame support members and cause the fastener to move inboard or outboard in slots defined in the frame support members in order to adjust wheel camber. Shims are disposed about the fastener on either side of the control arm between the control arm and the frame support members. Shims are removed from one side and added to the other side to move the control arm in the fore-aft direction and adjust wheel caster Alternatively, the fore-aft position of the control arm may be adjusted by rotating a threaded bushing disposed about the fastener and extending through the control arm.

20 Claims, 2 Drawing Sheets

OTHER PUBLICATIONS

Autom Mechanics Fundamentals, by Martin W. Stockel and Martin T. Stockel, The Goodheart–Willcox Company, Inc. Publishers, 1982, P. 378.

Brochure—Fast and easy axle alignment. Hendrickson Quick–Align® Rear Axle Suspension Alignment System (undated).

Application No. 10/008,969, filed Dec. 7, 2001, entitled "Positive Shim Locking System for Suspension Adjustment Device" and Drawing.

International Search Report, PCT/US 02/38703.

* cited by examiner

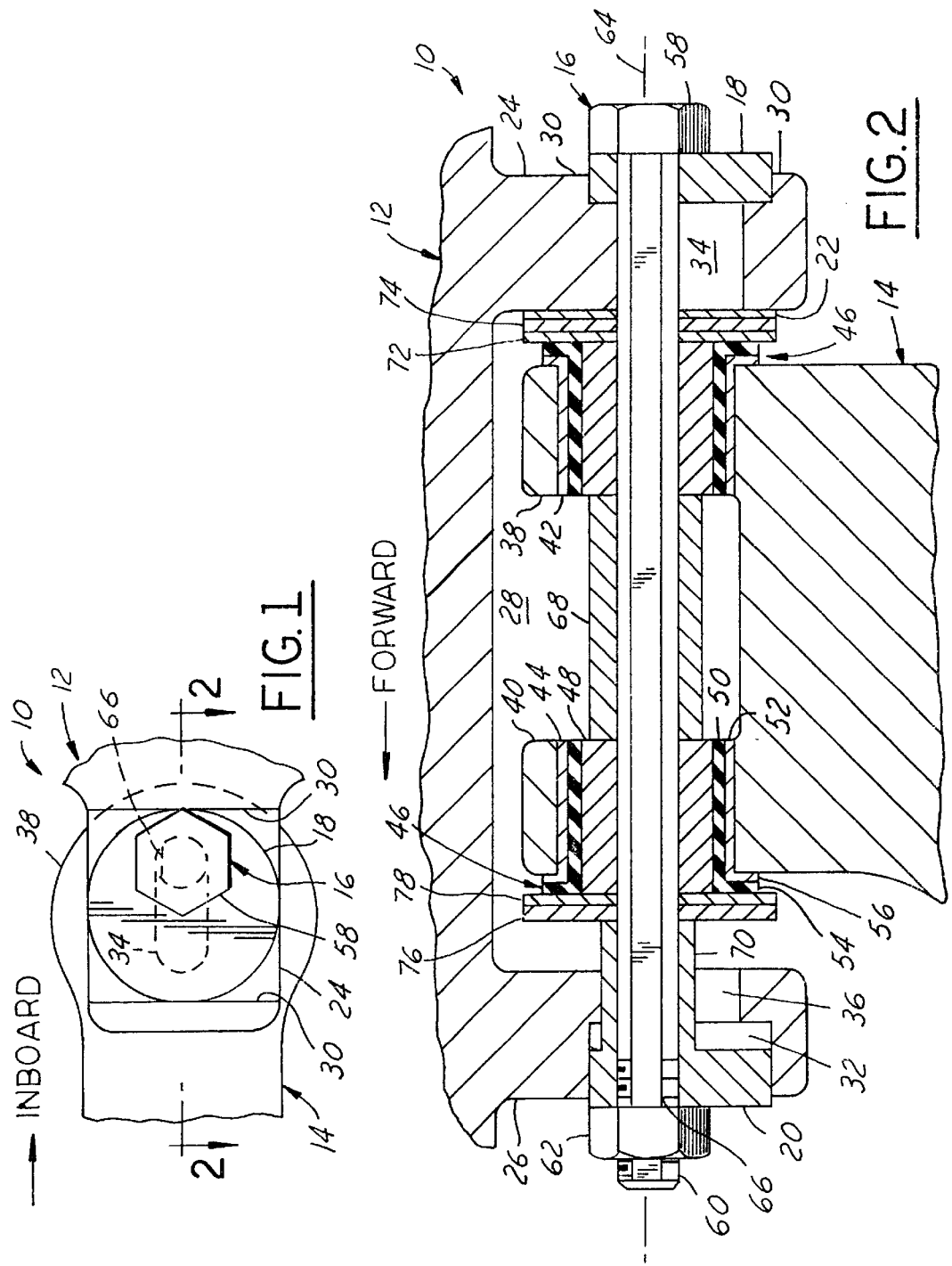

SUSPENSION CAMBER AND CASTER ADJUSTMENT SYSTEM

FIELD OF THE INVENTION

This invention relates to vehicle suspension adjustment systems, and in particular, to a self-contained system for adjusting both camber and caster.

DISCLOSURE OF THE ART

Conventional vehicle suspensions include devices for adjusting the position of suspension control arms to control wheel camber and/or caster. One conventional system for adjusting wheel camber includes a mounting bolt that extends in a fore-aft direction of the vehicle through a suspension control arm and a pair of support members of a vehicle frame disposed on either side of the control arm. The support members include elongated slots configured to allow movement of the bolt along a transverse axis perpendicular to the longitudinal axis of the bolt. Cams are disposed proximate either end of the mounting bolt and move in grooves defined in either the support members of the vehicle frame or retaining plates attached to the support members. Rotation of the cams causes movement of the bolt along the transverse axis and enables adjustment of wheel camber. This adjustment system, however, does not enable adjustment of wheel caster.

Another conventional system for adjusting both wheel camber and wheel caster includes a mounting plate that extends in a fore-aft direction of the vehicle between the eyes of a bifurcated suspension control arm. The system further includes two bolts extending transversely to the direction of vehicle travel and into the mounting plate. Shims are supported on each bolt. Adding or removing shims on either bolt enables adjustment of wheel caster. Adding or removing equal numbers of shims from both bolts enables adjustment of wheel camber. Although this adjustment system enables adjustment of both wheel camber and caster, the system suffers from several other disadvantages. First, the system requires a relatively large amount of time to make desired adjustments. Second, caster adjustment cannot be entirely independent of camber adjustment, since the addition or removal of shims from one bolt necessarily affects the camber of the wheel. Third, the system requires storage and maintenance of the shims.

There is thus a need for a suspension adjustment system that will minimize or eliminate one or more of the above-mentioned deficiencies.

SUMMARY OF THE INVENTION

The present invention provides an improved suspension adjustment device.

A suspension adjustment device in accordance with the present invention includes a fastener disposed about a longitudinal axis. The fastener extends through a slot defined in a first support member of a vehicle frame, a control arm, and a slot defined in a second support member of a vehicle support frame. The inventive assembly further includes a first cam disposed about the fastener and disposed within a groove in the first support member of the vehicle frame. The inventive assembly further includes a second cam disposed about the fastener and disposed within a groove in the second support member of the vehicle frame. The inventive assembly finally includes means for adjusting the position of the control arm relative to the vehicle support frame along the longitudinal axis of the fastener. In one embodiment of the invention, the adjustment means comprises one or more shims disposed about the fastener between one of the support members of the vehicle frame and the control arm. In another embodiment of the invention, the adjustment means comprises a threaded bushing that is disposed about the fastener and disposed partially within the control arm. The rotation of the bushing adjusts the fore-aft position of the control arm, thereby adjusting wheel caster. Rotation of the first and second cams causes movement of the fastener along a transverse axis perpendicular to the longitudinal axis of the fastener, thereby adjusting wheel camber.

A suspension adjustment device in accordance with the present invention has several advantages as compared to conventional suspension adjustment devices. The suspension adjustment device of the inventive assembly combines both camber and caster adjustment in one control arm mounting system. The inventive device also uses a single fastener to attach the control arm to the vehicle frame. This simplifies the adjustment of the control arm and wheel camber because both the forward and rear portions of the control arm move together when adjusting camber. The inventive device further provides, in one embodiment of the invention, for the interchange of shims during adjustment so that the sum total of shims remains constant before and after adjustment and there is no need to store or maintain the shims. Finally, in one embodiment of the invention, the inventive device clamps the suspension control arm to one of the vehicle frame support members while allowing the control arm to float relative to the other support member. This allows the use of low ductility material for the support member, such as heat treated aluminum.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a side view of a suspension adjustment device in accordance with one embodiment of the present invention.

FIG. 2 is a cross-sectional view of the suspension adjustment device of FIG. 1 taken along the lines 2—2.

DETAILED DESCRIPTION OF THE PREFERRED EMBODIMENT

Figure 3:
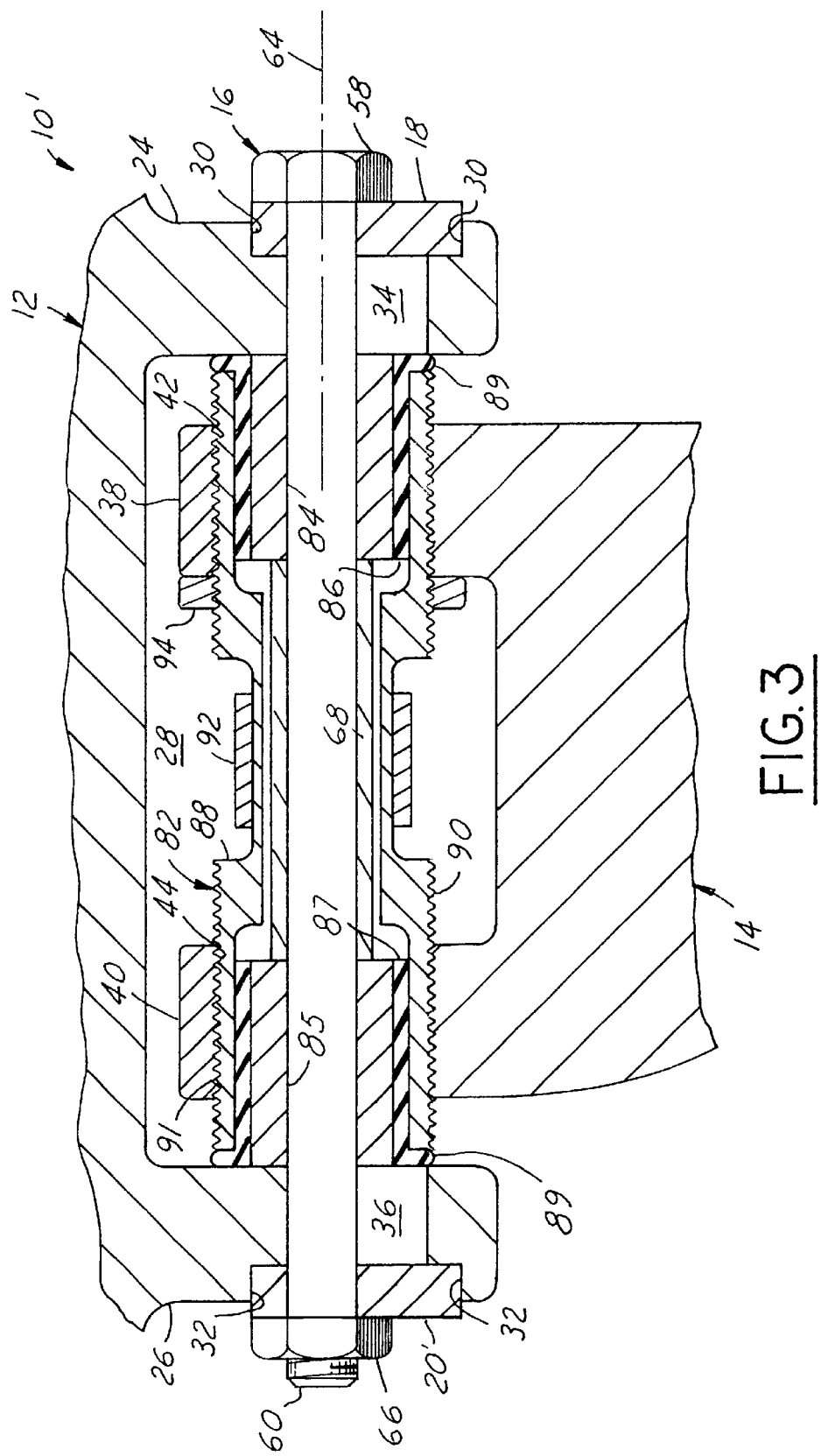
FIG. 3 is a cross-sectional view of a suspension adjustment device in accordance with a second embodiment of the present invention.

Referring now to the drawings wherein like reference numerals are used to identify identical components in the various views, FIGS. 1 and 2 illustrate a suspension adjustment device 10 in accordance with one embodiment of the present invention. Device 10 is provided to adjust the position, relative to vehicle frame 12, of a suspension control arm 14 in order to adjust wheel camber and caster. Device 10 is configured for use in an independent front suspension assembly of a vehicle. It should be understood, however, that device 10 may find use in conventional front and rear wheel suspensions, and in a variety of vehicles including automobiles and trucks. As discussed in greater detail hereinbelow, device 10 may include a fastener 16, cams 18, 20, and means, such as one or more shims 22, 72, 74, 76, 78 for adjusting the position of control arm 14 relative to frame 12 in the fore-aft direction (i.e., along the longitudinal axis of fastener 16).

Vehicle frame 12 provides a rigid structural foundation for the vehicle body (not shown), and an anchorage support for the vehicle suspension system. Vehicle frame 12 may be constructed of steel members, or any similar material that will provide a rigid support. Vehicle frame 12 may also be a sub-frame or component of an overall vehicle frame. It should be understood, however, that material composition and method of manufacture of vehicle frame 12 may be varied without departing from the spirit of the present invention.

As shown in FIG. 2, vehicle frame 12 may include a pair of support members 24, 26. Support members 24, 26 may be spaced apart to define an interior space 28 between the support members to receive control arm 14. Support member 24 has a groove 30 configured to receive cam 18. Similarly, support member 26 has a groove 32 configured to receive cam 20. Grooves 30, 32 may be milled in support members, 24, 26, respectively. In the illustrated embodiment, grooves 30, 32 are milled in the sides of members 24, 26 facing away from interior space 28. Alternatively, grooves 30, 32 may be milled in the sides of support members 24, 26 facing interior space 28. Grooves 30, 32 may have a uniform width, and are preferably orientated in a vertical direction, as shown in FIG. 1. It will be appreciated by those skilled in the art that grooves 30, 32 may be created in support members 24, 26 in a variety of ways including, for example, by attaching retaining plates defining grooves to support members 24, 26 or by forming parallel sets of flanges in support members 24, 26. Groove 32 has a greater depth than groove 30 to enable movement of cam 20 within groove 32 in the longitudinal direction of fastener 16, for tolerance stack-up purposes.

Support members 24, 26 also define elongated slots 34, 36, respectively. Slots 34, 36 are in communication with grooves 30, 32, respectively. In the illustrated embodiment, slots are disposed in the sides of members 24, 26 facing away from interior space. It should be understood, however, that slots may alternatively be defined in the sides of members 24, 26 facing interior space 28 (with grooves 30, 32 milled in the sides facing away from interior space 28). Slots 34, 36 are elongated in a transverse direction relative to the longitudinal direction of fastener 16. Slot 34 has a minor axis having a size about equal to the diameter of fastener 16. Slot 36 has a minor axis having a size about equal to the diameter of an extension 70, discussed below, that extends from cam 20.

Control arm 14 is provided as a component of an independent front suspension used to dampen vibration from the vehicle wheels to the vehicle frame. Control arm 14 supports a steering knuckle (not shown) on which a vehicle wheel is disposed and can be used to adjust the position of a vehicle wheel (not shown) relative to the vehicle. Control arm 14 may be an upper control arm or a lower control arm of a suspension system. Control arm 14 is conventional in the art and may be made from steel or other conventional metals or metal alloys.

Referring to FIG. 2, control arm 14 may be bifurcated and include branches 38, 40. Disposed within branches 38, 40 are apertures 42, 44, respectively, for receiving fastener 16. Branches 38, 40 may further include bushings 46 disposed within apertures 42, 44, respectively. Bushings 46 are provided to radially support branches 38, 40 of control arm 14 about fastener 16. Bushings 46 are conventional in the art, and may include an inner sleeve 48, a mid-portion 50, and an outer sleeve 52. Inner sleeve 48 and outer sleeve 52 may be made of steel other conventional metals or metal alloys. Mid-portion 50 may be made of, for example, rubber or polyurethane. Mid-portion 50 and outer sleeve 52 may be provided with flanges 54, 56, respectively, which allow bushings 46 to receive loads axially in addition to receiving radial loads.

Fastener 16 is provided to attach control arm 14 to vehicle frame 12, and to supply a structure upon which control arm 14 can pivot, relative to vehicle frame 12. Fastener 16 is conventional in the art, and may be a bolt having a head 58 and a threaded end 60 for receiving a nut 62. It should be understood, however, that fastener 16 may alternatively comprise a screw, pin, threaded shaft, or other conventional fastener. Fastener 16 is disposed about a longitudinal axis 64. Fastener 16 may have a flat side 66 which extends parallel to longitudinal axis 64. Fastener 16 extends through groove 30 and slot 34 of support member 24, apertures 42, 44 of branches 38, 40 of control arm 14, and slot 36 and groove 32 of support member 26. Referring to FIG. 2, a fixed spacing member 68 may be disposed about fastener 16 in interior space 28 between branches 38, 40 of control arm 14. Fixed spacing member 68 receives axial loads along fastener 16 and maintains a constant distance between bushings 46 in branches 38, 40. Fixed spacing member 68 may be made of steel or other conventional metals or metal alloys.

Cams 18, 20 are provided to enable rotation and positioning of fastener 16 within slots 34, 36 of support members 24, 26, respectively. Cams 18, 20 are disposed about fastener 16 and within grooves 30, 32, respectively. Cams 18, 20, may be generally circular, and captive within grooves 30, 32, respectively. The diameters of cams 18, 20 are slightly less than the width of grooves 30, 32, so that cams 18, 20 are free to rotate within grooves 30, 32. Cams 18, 20 each further have eccentrically positioned D-shaped holes configured to receive fastener 16. The flat side of each D-shaped hole is provided to engage flat side 66 of fastener 16.

Cam 20 is provided with an extension 70 that extends longitudinally through slot 36 of support member 26. As shown in FIG. 2, when fastener 16 is secured, cam 20 floats within groove 32 of support member 26. In contrast, cam 18 is clamped to support member 24 securely within groove 30 when fastener 16 is secured. Extension 70 is provided to allow for adjustment of the position of cam 20 in the fore-aft direction within groove 32 to adjust for dimensional tolerances of the components in device 10. Further, because control arm 14 floats relative to support member 26, the use of low ductility metals for the support frame 12, such as heat treated aluminum, is enabled.

Rotation of cams 18, 20, adjusts the position of fastener 16 along the widths, i.e., transverse axes, of slots 34, 36. Such adjustment of fastener 16 necessarily adjusts the position of control arm 14, through which fastener 16 passes, along a transverse axis perpendicular to the longitudinal axis 64 of fastener 16. As evident from the orientation of device 10 depicted in FIGS. 1 and 2 with respect to the vehicle (not shown), adjustment of fastener 16 in slots 32, 34 adjusts the inboard/outboard position of control arm 14 with respect to vehicle frame 12. That is, this adjustment adjusts the camber of the wheel associated with control arm 14.

In addition to providing cams 18, 20 and slots 34, 36 for adjusting the inboard/outboard position of control arm 14, the present invention further provides means for adjusting the position of control arm 14 relative to vehicle support frame 12, along the longitudinal axis 64 of fastener 16; i.e., adjusting the caster of the wheel associated with control arm 14. Caster adjustment is provided through a variable spacing member that controls the position of control arm 14 relative to the frame 12 along the longitudinal axis 64 of the fastener 16.

As shown in FIG. 2, in one embodiment of the invention, the variable spacing member comprises one or more shims 22, 72, 74, 76, 78. Shims 22, 72, 74, 76, 78 may be made out of conventional metals, metal alloys, or plastics, and may be stamped, forged, or molded from such material. Shims 22, 72, 74, 76, 78 may also be formed from conventional plastics. Shims 22, 72, 74, 76, 78 are disposed about fastener 16. Shims 22, 72, 74 are disposed between support member 24 and branch 38 of control arm 14. Shims 76, 78 are disposed between support member 26 and branch 40 of control arm 14. Shims 72, 78 may abut flanges 54 of bushings 46. The position of control arm 14 along the longitudinal axis 64 of fastener 16 may be adjusted by removing one or more of shims 22, 72, 74, 76, 78, or adding one or more additional shims, between either of support members 24, 26 and control arm 14.

In accordance with one advantage of the present invention, one or more shims 22, 72, 74 may be removed from between support member 24 and control arm 14 and then added between support member 26 and control arm 14 to adjust the longitudinal position of control arm 14. Similarly, one or more shims 76, 78 may be removed from between support member 26 and control arm 14 and then added between support member 24 and control arm 14 to adjust the longitudinal position of control arm 14. Such trading of shims provides a constant total of shims before and after adjustment of the longitudinal position of control arm 14 thereby eliminating the need to store and maintain shims.

Referring now to FIG. 3, a device 10' in accordance with a second embodiment of the present invention is illustrated. Device 10' may include many of the same components as device 10. These components have retained the same numbers used in previous Figures and are discussed hereinabove. Device 10' differs from device 10 in that cam 20' has no extension, and in the provision of a different variable spacing member. The variable spacing member of device 10' comprises a threaded bushing 82. Bushing 82 is extends through and is partially disposed within both branches 38, 40 of control arm 14. Bushing 82 may include inner sleeves 84, 85 mid-portions 86, 87 and an outer sleeve 88. Inner sleeves 84, 85 and outer sleeve 88 may be made of steel other conventional metals or metal alloys. Mid-portions 86, 87 may be made of, for example, rubber or polyurethane. Mid-portions 86, 87 may have a radially extending flange 89 disposed about one end to receive axial loads, and to abut vehicle frame 12. As shown in FIG. 3, inner sleeves 84, 85 may be spaced apart by fixed spacer 68.

Outer sleeve 88 includes a plurality of threads 90. Apertures 42, 44 in branches 38, 40, respectively, also include corresponding pluralities of mating threads 91. Threads 90 are provided to drive branches 38, 40 of control arm 14 along outer sleeve 88. In so driving, the longitudinal position of control arm 14 is adjusted along longitudinal axis 64 thereby adjusting wheel caster. Control arm 14 may be driven by rotating threaded bushing 82. Bushing 82 has a hexagonally shaped mid portion 92 for receiving a tool, such as a wrench, to rotate bushing 82. The position of threaded bushing 82 may be secured by a jam nut 94.

A suspension adjustment device in accordance with the present invention represents a significant improvement as compared to conventional suspension adjustment devices. First, the inventive adjustment device allows adjustment of both wheel camber and wheel caster. Second, the inventive adjustment device allows adjustments to made more quickly than conventional adjustment devices because the suspension control arm is supported on a single fastener. Third, the inventive adjustment device enables the use of a constant number of shims thereby eliminating the need for storage and maintenance of shims that are not in use. Fourth, the inventive adjustment device enables the use of low ductile metals such as heat treated aluminum. Finally, the inventive adjustment device enables easy adjustment to account for tolerance stackups in the device.

While the invention has been particularly shown and described with reference to the preferred embodiments thereof, it is well understood by those skilled in the art that various changes and modifications can be made in the invention without departing from the spirit and scope of the invention.

I claim:

1. A suspension adjustment device, comprising:
   a fastener disposed about a longitudinal axis and extending through a slot defined in a first support member of a vehicle frame, a control arm, and a slot defined in a second support member of the vehicle frame;
   a first cam disposed about the fastener and disposed within a groove defined in the first support member of the vehicle frame;
   a second cam disposed about the fastener and disposed within a groove in the second support member of the vehicle frame; and
   means for adjusting the position of the control arm relative to the vehicle frame along the longitudinal axis of the fastener;
   wherein rotation of the first and second cams causes movement of the fastener along a transverse axis perpendicular to the longitudinal axis of the fastener.

2. The suspension adjustment device of claim 1, wherein the means for adjusting comprises a first removable shim disposed about the fastener between one of the first and second support members of the vehicle frame and the control arm.

3. The suspension adjustment device of claim 2, wherein the means for adjusting further comprises a second removable shim disposed about the fastener between the one support member of the vehicle frame and the control arm.

4. The suspension adjustment device of claim 3, wherein the means for adjusting further comprises a third removable shim disposed about the fastener between another of the first and second support members of the vehicle frame and the control arm.

5. The suspension adjustment device of claim 1, wherein the means for adjusting comprises a threaded bushing disposed about the fastener and partially disposed within the control arm.

6. The suspension adjustment device of claim 1, wherein the first cam includes an extension disposed about the fastener and extending longitudinally through the slot of the first support member.

7. The suspension adjustment device of claim 1 wherein the first cam is axially movable within the groove in the first support member of the vehicle frame.

8. The suspension adjustment device of claim 1, wherein the control arm comprises an upper control arm or a lower control arm.

9. A suspension adjustment device, comprising:
   a fastener disposed about a longitudinal axis and extending through a slot defined in a first support member of a vehicle frame, a control arm, and a slot defined in a second support member of the vehicle frame;
   a first cam disposed about the fastener and disposed within a groove defined in the first support member of the vehicle frame;

a second cam disposed about the fastener and disposed within a groove in the second support member of the vehicle frame; and a variable spacing member disposed about the fastener between one of the first and second support members of the vehicle frame and the control arm wherein rotation of the first and second cams causes movement of the fastener along a transverse axis perpendicular to the longitudinal axis of the fastener.

10. The suspension adjustment device of claim 9, wherein the variable spacing member comprises a first removable shim.

11. The suspension adjustment device of claim 10, wherein the variable spacing member further comprises a second removable shim.

12. The suspension adjustment device of claim 9, further comprising a removable shim disposed about the fastener between another of the first and second support members of the vehicle frame and the control arm.

13. The suspension adjustment device of claim 9, wherein the variable spacing member comprises a threaded bushing disposed about the fastener and partially disposed within the control arm.

14. The suspension adjustment device of claim 9, wherein the first cam includes an extension disposed about the fastener and extending longitudinally through the slot of the first support member.

15. The suspension adjustment device of claim 9 wherein the first cam is axially movable within the groove in the first support member of the vehicle frame.

16. The suspension adjustment device of claim 9, wherein the control arm comprises an upper control arm or a lower control arm.

17. A suspension adjustment device, comprising:

a fastener disposed about a longitudinal axis and extending through a slot defined in a first support member of a vehicle frame, a control arm, and a slot defined in a second support member of the vehicle frame;

a first cam disposed about the fastener and disposed within a groove defined in the first support member of the vehicle frame, said first cam movable along the longitudinal axis within the groove;

a second cam disposed about the fastener and disposed within a groove in the second support member of the vehicle frame; and a first shim disposed between one of the first and second support members of the vehicle frame and the control arm wherein rotation of the first and second cams causes movement of the fastener within the slots along a transverse axis perpendicular to the longitudinal axis of the fastener.

18. The suspension adjustment device of claim 17, further comprising a second shim disposed about the fastener between the one support member and the control arm.

19. The suspension adjustment device of claim 17, further comprising a second shim disposed about the fastener between another of the first and second support members of the vehicle frame and the control arm.

20. The suspension adjustment device of claim 17, wherein the first cam includes an extension disposed about the fastener and extending longitudinally through the slot of the first support member.

* * * * *